United States Patent [19]
Karner et al.

[11] Patent Number: 5,771,552
[45] Date of Patent: Jun. 30, 1998

[54] METHOD FOR ASSEMBLING AND CURING GOLF CLUBS

[75] Inventors: James E. Karner, Grayslake; Jessica A. Laprade, Des Plaines, both of Ill.

[73] Assignee: Tommy Armour Golf Company, Morton Grove, Ill.

[21] Appl. No.: 869,044

[22] Filed: Jun. 4, 1997

[51] Int. Cl.$^6$ .............................. A63B 53/00; A63B 53/02
[52] U.S. Cl. ......................... 29/407.1; 473/409; 473/305; 29/407.09
[58] Field of Search ........................ 114/24.24; 473/409, 473/305; 269/294, 296; 29/281.5, 407.1, 407.09

[56] References Cited

U.S. PATENT DOCUMENTS

| | | | |
|---|---|---|---|
| 2,891,138 | 6/1959 | Letters | ................................... 219/616 |
| 3,625,513 | 12/1971 | Ballmer . | |
| 4,466,601 | 8/1984 | Raines | ...................................... 269/79 |
| 4,869,304 | 9/1989 | Gore | ........................................ 144/354 |
| 4,958,834 | 9/1990 | Colbert . | |
| 5,273,280 | 12/1993 | Lo . | |
| 5,429,358 | 7/1995 | Rigal et al. . | |

*Primary Examiner*—Sebastiano Passaniti
*Assistant Examiner*—Stephen L. Blau
*Attorney, Agent, or Firm*—Tilton, Fallon, Lungmus & Chestnut

[57] ABSTRACT

An apparatus and method for first reliably and accurately aligning the shafts of golf clubs in consistent orientation relative to corresponding club heads during assembly thereof, and second for performing inductive curing on the aligned golf club. A golf club is supported in an address position in a combination alignment/inductive cure station. The club shaft is supported by an inclined V-shaped channel, and the club head is supported in a club head support which includes a gel-filled trough for conforming to the sole of the club head. The leading edge of the club head is aligned against two substantially vertical alignment posts extending from the club head support, and reference graphics on the shaft are used in combination with an alignment panel to visually obtain the desired relative orientation of the shaft and club head. The club is then clamped in place, and an inductive heating element heats the joint of the shaft and club head to activate a bonding agent. A separate cold air cooling member returns the golf club joint to an operator handable temperature for speed of production.

21 Claims, 4 Drawing Sheets

METHOD FOR ASSEMBLING AND CURING GOLF CLUBS

BACKGROUND OF THE INVENTION

1. Field of the Invention

This invention relates generally to golf club manufacturing and assembly and, more specifically, to the alignment and support of club shafts and club heads during inductive curing processes for securing club heads onto club shafts.

2. Description of the Prior Art

A critical step in the manufacture of golf clubs is the assembly of the club head onto the club shaft. A well understood prior technique for reliably achieving a suitable, secure bond between the club head and the club shaft is to apply an epoxy adhesive to the shaft and/or the club head, hold the club head in place on the shaft, and the adhesive on the joint is cured through an ambient/chemical reaction.

In order to achieve desirable uniformity in graphics and aesthetics among all golf clubs in a given correlated set of clubs, it is necessary to repeatedly locate each club shaft of the set with precisely the same orientation relative to each complementary club head. One known technique for maintaining uniform orientation of shafts and club heads throughout a set of golf clubs was to first locate and mark the seam of the club shaft, and then place the seam of each shaft in a similar predetermined orientation relative to each club head. Such a technique was described in U.S. Pat. No. 4,958,834. However, with the advent of modern graphite and synthetic composite material golf club shafts, such a technique is obsolete because a vast majority of golf club shafts today are seamless.

Even with seamless shafts, it is still desirable to consistently orient club shafts with respect to club heads to maintain cosmetic, visual uniformity in a set of golf clubs. Many commercial golf club shafts feature graphics printed in some acceptable manner, such as by silk screening. Several examples of typical graphics include brand names, corporate trademarks, logos, sponsors' names, model name of the particular line of clubs, a replica of a celebrity endorser's autograph signature, shaft type (like graphite, steel, or titanium), and the performance characteristic (e.g. regular, stiff, extra stiff, ladies, senior, or lite), to name a few. In addition, for security and identification purposes a set of golf clubs can be personalized with an individual golfer's name or monogram pre-printed on the shafts. It is preferable that such graphics on each shaft appear to a golfer in a consistent orientation relative to each club head in a given set of clubs so as not to distract the golfer when any particular club in the set is held at address.

While currently the United States Golf Association requires a shaft's performance be consistent regardless of its orientation relative to the club head, if that changes in the future, the present invention allows specific alignment of such a non-uniform club shaft to a club head.

SUMMARY OF THE INVENTION

In order to reliably orient each golf club shaft identically, relative to each complementary golf club head for a given set of golf clubs, the present invention utilizes an easy-to-operate combination of alignment and inductive curing apparatus in one assembly station. A club shaft is prepared for mounting of a club head thereon once the club shaft has been tipped. Tipping involves removing a given amount of shaft material from the tip end of the shaft in order to impart desired flex characteristics to the shaft, abrading the cut tip end to aid in the adhesion of the bonded joint and to remove any undesired shavings or burrs from the tipping procedure, and providing the club head-shaft joint with a ferrule (if required), which is a tapered, cylindrical part that, depending on the design of the hosel, fits over the top of the hosel portion of the club head or includes a recessed portion into which the top of the hosel snugly fits.

The tip end of the shaft is then typically dipped in a suitable bonding agent, such as two or more/part chemical epoxy adhesive, although it is also possible to pour the epoxy into the hosel portion of the club head, and the club head is placed on the shaft. Before the epoxy adhesive has a chance to cure, and while the shaft is still rotatable relative to the club head, proper alignment and depth of penetration of the shaft into the hosel portion of the club head is achieved with the present invention by placing the golf club on the combination alignment/inductive curing station. While the club head is supported in a stationary position in the alignment/inductive curing station, an operator adjusts the club shaft by rotating it until graphics present on the club shaft are in a proper, predetermined alignment relative to the club head. Additional graphics may be provided on the shaft specifically for alignment purposes, or the graphics typically present on a shaft, such as a model name, performance characteristic, logo or celebrity endorser's signature, may be used for such alignment.

The combination alignment/inductive curing station features a substantially V-shaped support channel for supporting club shafts. The V-shaped support channel is preferably fixed at a 60° angle to the horizontal plane for supporting a golf club in an address position during the alignment and curing operations. The club head sits in a club head support, which incorporates an adjustable, horizontally-aligned trough containing a conformable material, such as a viscous gel substance. The gel substance can be of the type such as found in bicycle seat cushions. The gel substance provides a cushioned universal club head support so as to compensate for virtually any shape, size, and/or lie angle of the club head. This eliminates the need for many different club head supports for club heads of various sizes or shapes. The gel substance also is non-abrasive and non-caustic, so no unwanted residue remains on the club head after removal from the club head support. In addition, the gel substance reduces risk of undesired scratching or gouging of the golf club heads. The gel substance also provides a compressive force which forces the club head firmly upwardly against the shaft without any extra clamping means.

The club head support also includes two substantially vertical posts positioned adjacent the horizontal trough to provide a guide against which to align a standard reference portion on the golf club head, which preferably is the lower leading edge of a club head. With the leading lower edge of the club head positioned against the posts, an operator can use alignment means on the alignment/inductive curing station to line-up the reference graphics on the club shaft in a predetermined orientation relative to the club head, all prior to inductive curing. One suitable alignment means is an elongated aligning groove or window formed in a hinged panel adjacent the V-shaped groove; the alignment groove and hinged panel are preferably fixed at 60° off the horizontal plane. The club is then properly placed in the address position, with the shaft seated in the V-shaped groove, the club head resting in the conformable club head support, and the leading edge of the club head aligned against both vertical posts. The operator then closes the hinged panel and looks through the elongated groove or window while rotating the shaft inside the club head's hosel until the reference graphics on the shaft are observed to be properly oriented. Next, the operator activates one or more clamps to secure the golf club shaft in place in its now properly aligned condition.

Once the club shaft is fixed in place by the clamp or clamps at the proper orientation relative to the club head, a heating means, preferably comprising an inductive coil, is positioned adjacent the joint of the club head and shaft, i.e. at the hosel of the club head. It is recognized that various other heating means may be utilized, such as a controlled flame, infrared heat e.g. from a heat lamp, or a hot airstream. The operator then activates the inductive coil, which heats the club head joint to shaft temperatures in a range from about 160° F. to about 1000° F., preferably to a temperature of about 450° F., thereby activating the bonding agent. Thereafter, a cooling device, such as a cold air gun, which provides air at temperatures in a range of −30° F. to 35° F., may be used to immediately cool the joint so the club is ready for further processing, i.e. can be readily handled by the operator. In the preferred embodiment, alignment/inductive curing stations are set-up in tandem, so as to speed up the golf club manufacturing process by facilitating an operator's work on performing alignment operations on one club while a second club is curing.

DETAILED DESCRIPTION OF THE PREFERRED EMBODIMENT

Figure 1:
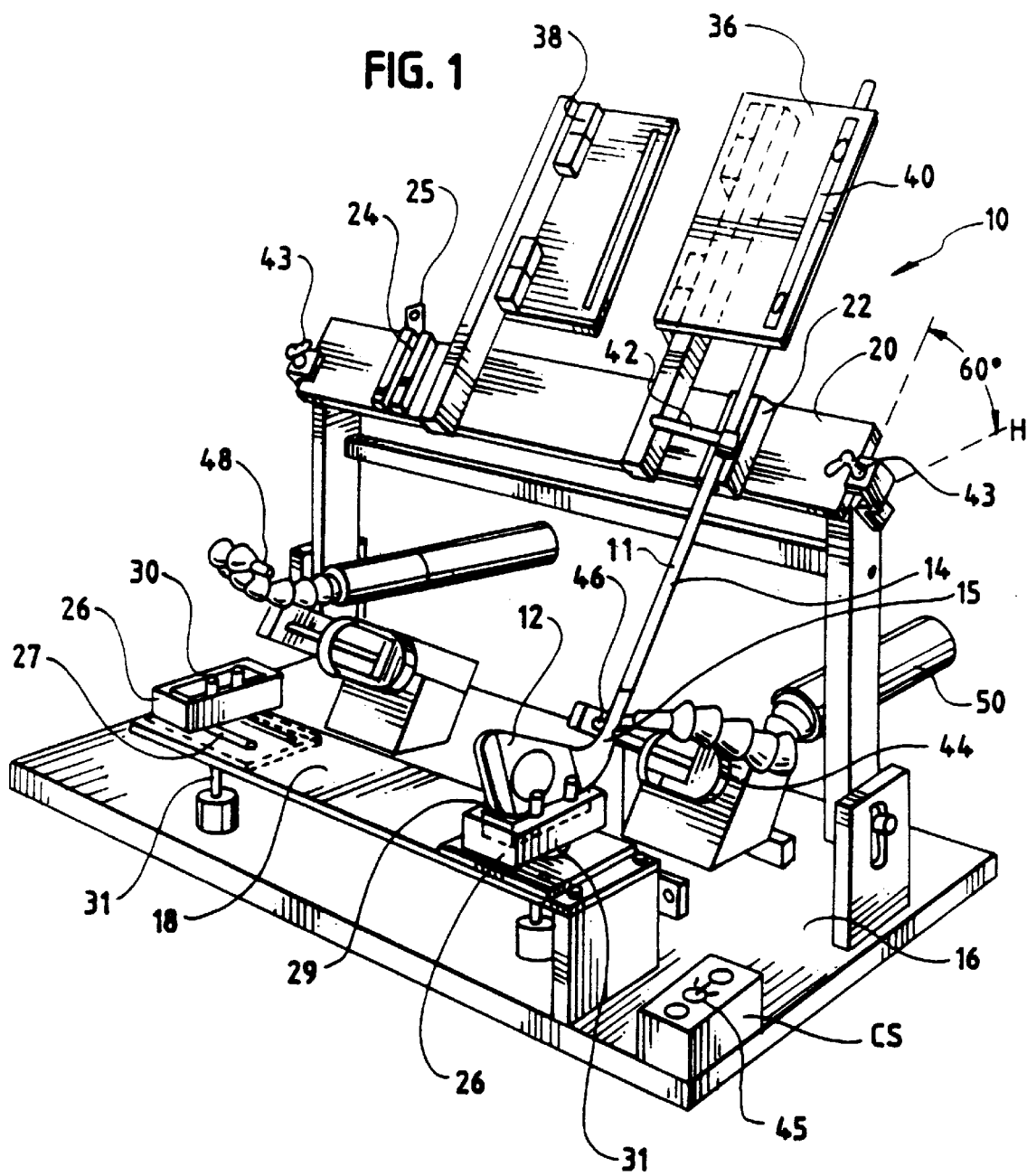
FIG. 1 is a perspective view of tandem alignment/inductive curing stations of the present invention.
Figure 2:
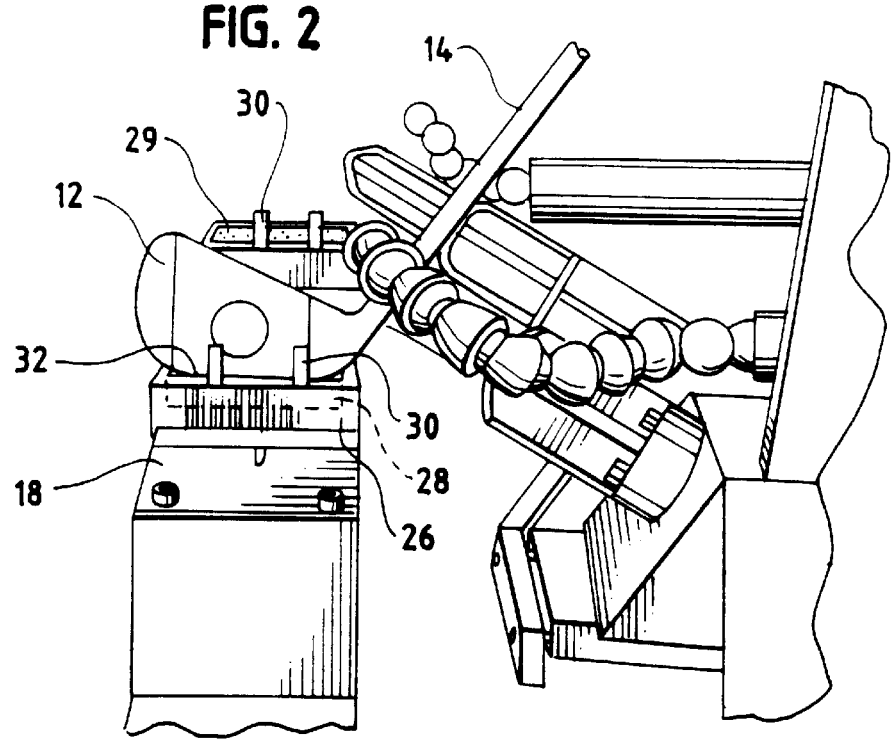
FIG. 2 is a right side perspective view of the tandem alignment/inductive cure stations shown in FIG. 1.
Figure 3:
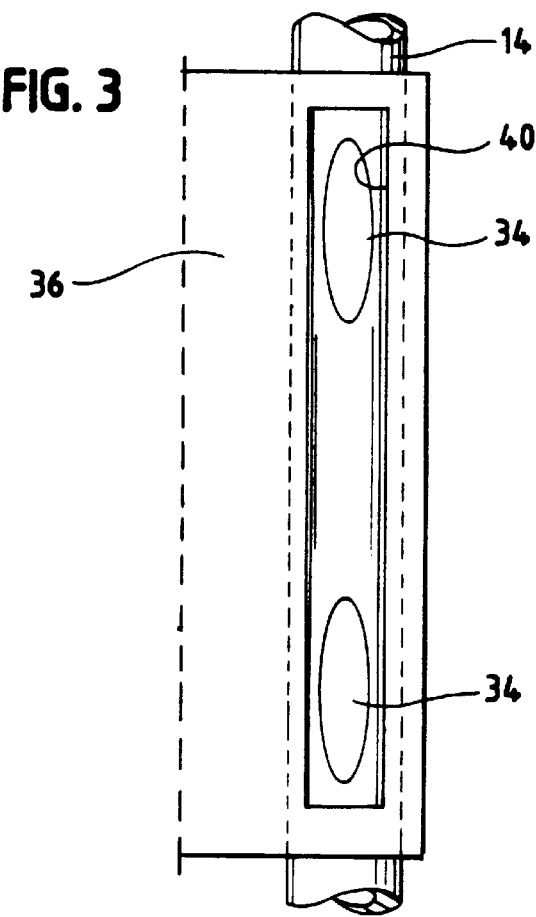
FIG. 3 is an enlarged front view of a hinged panel of an alignment/inductive curing station showing an aligned club shaft having graphics thereon visible through an elongated alignment groove on the hinged panel.
Figure 5:
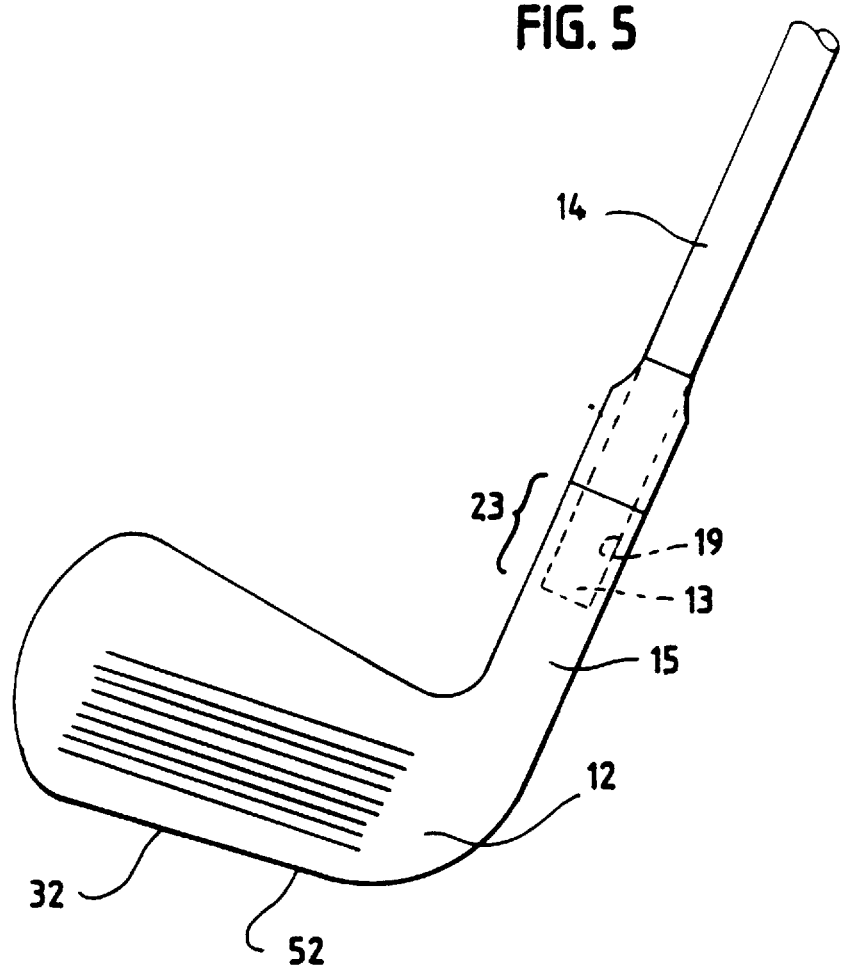
FIG. 5 is a n enlarged view of the club head-to-shaft joint.

Referring to FIGS. 1–3, the combination alignment/inductive cure station 10 of the present invention provides an easy-to-operate method for performing one of the most critical stages in the assembly of golf clubs, namely that of mounting the club head 12 to the shaft 14 of the club. Preliminarily, a club shaft must be readied to be supplied with a corresponding club head. Thus, the club shaft 14 is first a) appropriately tipped, i.e. the tip end 13 (see FIG. 5) is cut to provide the shaft with proper flex characteristics, b) the tip end of the shaft is abraded to remove any excess material such as burrs left over from the tipping procedure and also to aid adhesion, and c) the tip is provided with a ferrule (if required). Alternatively, where a tapered tip golf club shaft is used (not shown), as opposed to a parallel tip shaft as seen in the drawings, tipping of the shaft is not required. However, abrading may still be required as a preliminary step, even for tapered tip shafts.

A suitable bonding agent, such as a two-part epoxy adhesive, is utilized for bonding the club head to the shaft. The so-called "wet" epoxy can be applied to either the tip end 13 of the shaft 14, or the bore 19 within the hosel 15 of the club head 12 using a dispenser. Alternatively, the tip end 13 may simply be dipped into a supply of epoxy. The tip of the shaft is then inserted into the hosel 15 of the corresponding club head, i.e. the club head having the appropriate loft angle, depending on which particular club in the set is then being assembled, such as a 3-iron. (The loft angle of a club head is defined as the angle of the club head's strike face 17 relative to a vertical plane.)

To assure consistent visual, cosmetic alignment of each shaft of a set of golf clubs relative to each club's corresponding club head, the shaft 14 and club head 12 are placed into the alignment/inductive cure station 10 before the still wet epoxy hardens, i.e. while the shaft 14 may still be rotated relative to the club head 12. The alignment/inductive cure station 10 is preferably mounted on a work table 16. A raised club head support platform 18 is provided on the work table 16. Also provided on the work table 16 is a raised club shaft support platform 20. The club shaft support 20 is preferably fixed at a 60° angle relative to the horizontal plane H. The 60° angle corresponds to the median of the golf industry standard range for lie angles of golf clubs, with the overall range being approximately 50° to 75°. (A golf club's lie angle is defined as that angle made by the club head sole with the shaft.) It is recognized that other angles besides 60° for the club shaft support 20 may be used and still achieve the advantages of the present invention. It will be understood that the chosen angle for the club shaft support stage 20 is present to facilitate aligning and inductive curing a golf club while maintaining the club in an address position.

The club shaft support platform 20 is provided with a club shaft support block 22 which includes an elongated V-shaped channel 24 to receive and correctly position the shaft 14. The club head support platform 18 includes a horizontally adjustable club head support block 26, which includes a substantially rectangular, upwardly open trough 28. The trough 28 contains a conformable material, preferably a viscous gel 29, such as is available from Intouch, Inc. of Glendale, California. The gel 29 conforms to support the sole portion of the club head 12, and is preferably non-abrasive, non-transferring and non-caustic. The gel 29 has a resilient quality so as to provide a restoring force which pushes a club head 12 upward toward a corresponding shaft 14 when seated in the alignment/inductive curing station. Two substantially vertical alignment posts 30 extend from the horizontally adjustable club head support block 26 adjacent the trough 28. Any other contact block providing such two point contact would similarly work.

Suitable means are provided for horizontally adjusting the club head support block 26, most preferably a pneumatic adjustinu means. As shown in FIG. 1, the club head support block 26 is supported on linear bearings 27, with a pneumatically operated friction bearing 31 provided underneath the raised club head support platform 18. When engaged, the friction bearing 31 prevents horizontal axial movement of the club head support block 26, i.e. along the linear bearings 27. However, when needed, such as to adjust for club head offset, particular club head designs, and loft angle, for example, the club head support block 26 is moved by releasing the friction bearing 31.

The underside portion or sole 52 of a given club head 12 can have varying shapes and complex curvatures. Club heads also vary in size and loft angle, depending on the particular golf club in a given set of clubs for which the club head is made. Thus, the gel 29 provides a means to compensate for, i.e. supportingly conform to the many varying head shapes, sole configurations, and sizes of club heads. The gel 29 also avoids imparting undesired scratches or indentations to a club head by providing a soft rubber-like tacky cushion against which to rest the club head.

To properly align a golf club shaft 12 using the alignment/inductive cure station, an operator places the shaft of the golf club to be aligned in the elongated V-shaped channel 24 and places the golf club head onto the club head support 26 so that the sole of the club head rests in the conforming gel 29. Using the horizontal alignment means discussed above, the operator adjusts the club head support block 26 until the leading lower edge 32 of the club head contacts both alignment posts 30. The angled orientation of the shaft support block 22 relative to the horizontal plane H helps ensure the assembled club 11 is in proper address position.

There are pre-printed reference graphics 34 that are typically present on the golf club shaft 14, such as brand names, model names, corporate trademarks, logos, sponsors' names, name of the particular line of clubs, the type of shaft, such as steel, graphite, titanium, fiberglass, wood, or aluminum, or performance characteristics, e.g. regular, stiff, extra stiff, ladies, senior, or lite, to name a few, or aesthetic designs on the shaft. Such reference graphics 34 are used in conjunction with alignment means to properly align the shaft 14 in a repeatable, predetermined orientation relative to the club head 12. One suitable alignment means is a hinged panel 36 connected to the shaft support platform 20 by hinges 38. After the golf club is placed in the alignment/inductive cure station, the operator closes the hinged panel 36 over the V-shaped channel 24, with the shaft 14 sandwiched between the hinged panel 36 and the V-shaped channel 24. A portion of the club shaft 14 remains visible through the hinged panel 36 because of an elongated alignment slot or window 40 in the panel 36. The operator then rotates the shaft 14, keeping the club head 12 held in place by maintaining contact of the leading edge 32 of the club head 12 against the alignment posts 30, until the graphics 34 on the surface of the shaft 14 are seen through the alignment groove 40 to be in a desired position, i.e. that position to be maintained uniform for each club in a given set of correlated golf clubs. Because the shaft 14 must be rotated relative to the club head 12, such uniform alignment must be performed before the bonding agent, i.e. the wet epoxy, cures. It is recognized that one suitable method for aligning the shaft 14 is to provide reference graphics 34 having a particular font size that corresponds to the width of the alignment groove 40. Once the graphics 34 are completely visible through the alignment groove 40, the shaft 14 is properly aligned relative to the club head 12.

The quality of the operator's viewing angle of the graphics 34 through the alignment groove 40 is dependent on the thickness of the hinged panel 36. Preferably, the hinged panel has a thickness of about ¼inch. This allows for an accuracy of approximately ±1° for aligning the reference graphics 34.

Once the club shaft 14 is properly aligned relative to the club head 12, locking means are engaged to secure the golf club for inductive curing. The locking means may take the form of a locking clamp 42, which is preferably a pneumatic toggle clamp which engages when the operator flips a clamp switch 43. Once the golf club is so secured, i.e. clamped, the operator activates a control system (generally referenced by reference letter CS) to initiate inductive curing. First, the control system CS shuttles a horseshoe-shaped inductive heating element, such as an inductive coil 44, from a retracted position as seen in the left hand station of FIG. 1 to an engaging position as in the right hand station of FIG. 1. In its retracted position, the inductive coil 44 provides loading and unloading clearance for the golf club, and provides an unobstructed path for cooling air to be supplied subsequent to inductive curing to cool the club to an operator handable temperature for later processing. The inductive coil 44 shuttles forward to its engaging position, i.e. toward the golf club, which is the optimum position for energy transfer from the inductive coil 44 to the hosel 15. At such engaging position, a pair of diametrically opposed active ends 46 of the inductive coil 44 are positioned on either side of, but not in contact with, the hosel 15 of the club head 12, i.e. straddling the joint 23 between the shaft 14 and the club head 12.

After the control system CS has shuttled the inductive coil 44 to its engaging position, the control system next signals the inductive coil to begin its programmed process of inductive heating. Depending on the composition of the shaft 14 and head 12, e.g. steel, graphite, or fiberglass shafts and stainless steel, carbon steel, or titanium heads, the inductive coil 44 is automatically signaled to run a pre-programmed sequence to ensure proper energy allocation (via opposing active ends 46) necessary to cure the corresponding club head and shaft.

In a particularly preferred embodiment of the present invention, there are provided means for identifying the particular compositions of the shaft 14 and the club head 12. Such identifying means may include a selector switch 45 (shown in FIG. 1) allowing the operator to select a head material, and may further include a sensor 25 (such as a magnetic sensor) preferably positioned somewhere along the length of the shaft 14, such as (conveniently located) at the V-shaped channel 24 of the shaft support block 22. After such identifying means are used (to determine what type club components are present) and the appropriate pre-programmed sequence (utilizing such sensed component identification information) is selected, the inductive heating process of inductive coil 44 runs. Usually this variable cycle time is somewhere between 2 and 30 seconds, depending on the exact lead and shaft materials employed; also the automatically-adjusted power level will range between 100% and 0%. The joint 23, preferably along the lower portion of hosel bore 19, is heated to a temperature in the range of about 180° F. to about 1000° F., and preferably to about 450° F. Energy from the inductive coil 44 is advantageously localized and highly concentrated to only that lower joint portion of the assembled golf club 11. Once the inductive heating process is complete, the control system CS returns the inductive heating element 44 to its retracted position. A nozzle 48 from a cold air gun 50 is positioned to spray cold air directly at the joint 23 to cool the hosel 15 back to an operator handable temperature in order to perform further operations on the golf club 11. If desired, firing and shut-off of the cold air gun 50 may also be controlled by the control system CS.

Figure 4:
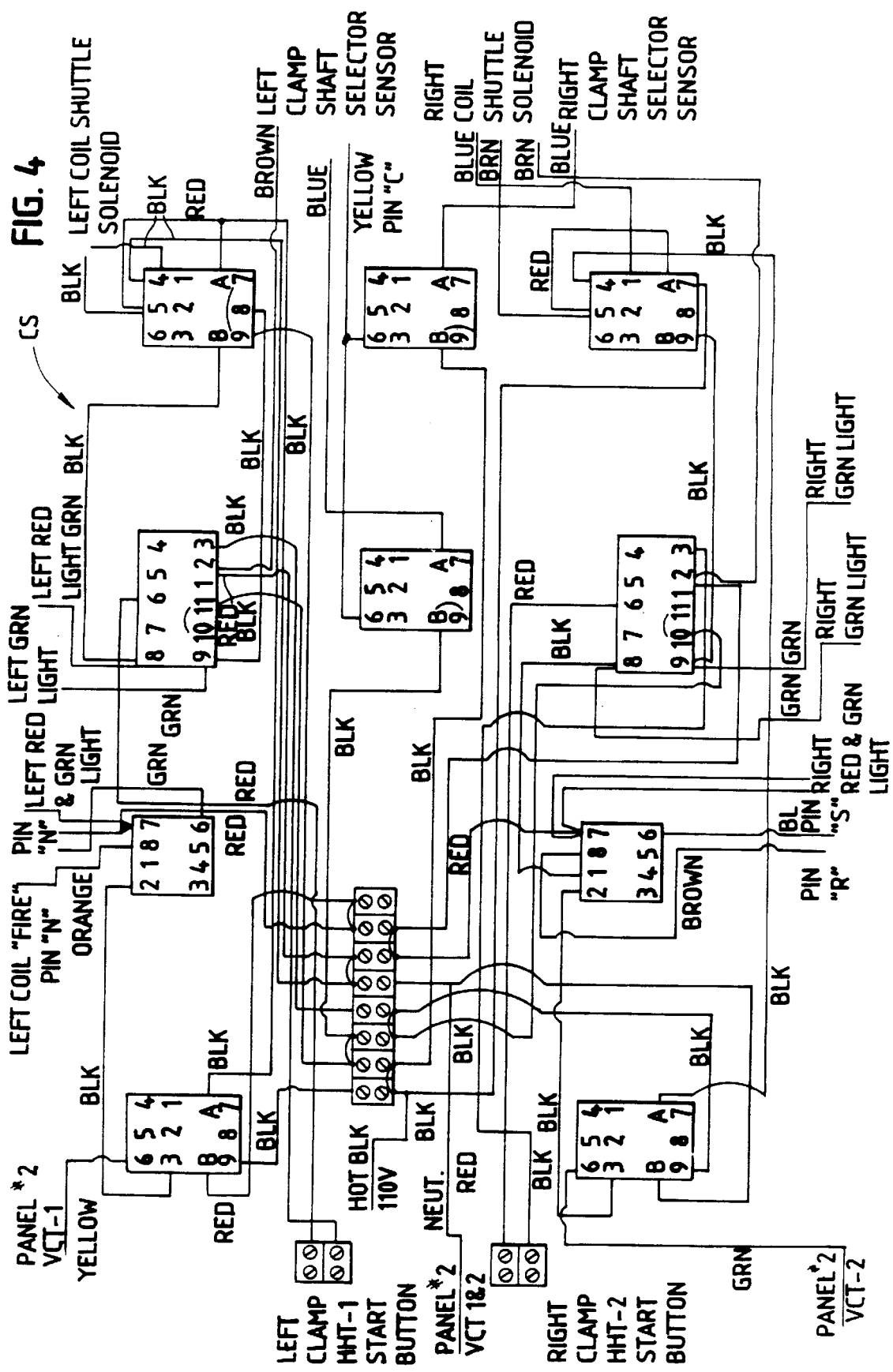
FIG. 4 is an exemplary circuit diagram for the tandem alignment/inductive curing stations shown in FIG. 1.

As shown in FIGS. 1 and 2, multiple alignment/inductive cure stations 10 may be mounted on a single work table 16 in order to achieve further manufacturing efficiencies, i.e. speed production. During any waiting period while inductive curing a golf club at one of the tandem alignment/inductive cure stations shown, the operator (not shown) can perform alignment operations on another golf club at the other associated station. Alternatively, one could perform inductive curing on multiple clubs simultaneously, but required power considerations favor only allowing one inductive coil 44 to operate at a given time. FIG. 4 shows an exemplary embodiment of a circuit diagram for the tandem alignment/inductive cure stations, to include the control system CS.

Although the present invention has been described with respect to particular embodiments thereof, it is recognized by those skilled in the art that it is not intended to be limited thereto and that changes and modifications can be made therein within the scope of the appended claims.

We claim:

1. A method for aligning a golf club shaft in a pre-determined orientation relative to a corresponding golf club head, of a correlated set of golf clubs, comprising the steps of:

placing a golf club shaft having reference graphics thereon and a golf club head into an alignment station consisting of a golf club head support, a golf club shaft support, and a panel having an elongated viewing opening therein;

aligning a reference portion of said club head against a pair of alignment posts on said club head support;

positioning said panel so the golf club shaft is visible through said elongated viewing opening; and rotating said shaft relative to said club head until said reference graphics are in a predetermined location relative to said elongated viewing opening.

2. The method of claim 1, wherein in aligning a reference portion, said reference portion of said club head comprises the leading lower edge of said club head.

3. The method of claim 1, and aligning said golf club shaft support at substantially a 60° angle relative to a horizontal plane, whereby said golf club shaft and said golf club head may be supported in an address position.

4. The method of claim 3, and aligning said golf club shaft support at an angle in a range of 50° to 75° relative to a horizontal plane, whereby said golf club shaft and said golf club head may be supported in an address position.

5. The method of claim 1, and pre-applying a bonding agent to a joint between the golf club shaft and the golf club head.

6. The method of claim 5, wherein in pre-appliying a bonding agent, said bonding agent is a heat curable agent.

7. The method of claim 6, wherein in pre-applying a bonding agent, said heat curable agent is an epoxy adhesive.

8. A method for aligning and securing a golf club shaft in a pre-determined orientation relative to a corresponding golf club head, comprising the steps of:

applying a curable bonding agent at a joint between a golf club shaft and a golf club head, said golf club shaft having reference graphics thereon;

placing said golf club shaft and said golf club head into a combination alignment and heat curing station consisting of a golf club head support, a golf club shaft support, a panel having an elongated viewing opening therein, and a heat curing element;

aligning a reference portion of said club head against an alignment means carried on said club head support;

positioning said panel so the golf club shaft is visible through said elongated viewing opening;

rotating said shaft relative to said club head until said reference graphics are in a predetermined location relative to said elongated viewing opening;

securing said shaft in place in said shaft support by a clamping means;

positioning said heat curing element adjacent the joint between said golf club head and said golf club shaft; and activating said heat curing element.

9. The method of claim 8, wherein in placing said golf club shaft and said golf club head into a combination alignment and heat curing station said heat curing element comprises an inductive heating coil member having two opposed active ends straddling the joint between said golf club head and said golf club shaft.

10. The method of claim 8, wherein in aligning a reference portion said reference portion of said club head is the leading lower edge of said club head.

11. The method of claim 8, and the step of applying cold air from a cold air gun to said joint after heat curing said joint thereby to quickly return said joint to an operator handable temperature.

12. The method of claim 8, wherein in securing said shaft in place said clamping means comprises an automatic clamp member.

13. The method of claim 8, wherein in aligning a reference portion said alignment means comprises a pair of alignment posts on said club head support.

14. The method of claim 8, and the step of horizontally adjusting said club head support to accommodate for club head design variations.

15. The method of claim 8, and the step of providing said club head support with a conformable material operable to supportably conform to sole design variations present in a given golf club head.

16. The method of claim 8, and the step of identifying the materials present for said golf club shaft and said golf club head, and the further step of utilizing the material identification information to set the power level and cycle time for said heat curing element.

17. The method of claim 8, wherein said heat curing element heats said joint to a temperature in a range of about 180° F. to about 1000° F.

18. The method of claim 8, wherein said heat curing element heats said joint to a temperature of about 450° F.

19. The method of claim 8, wherein said heat curing element activates for a period in a range from 2 seconds to 30 seconds.

20. The method of claim 19, wherein said activation period of said heat curing element is controlled by a pre-programmed sequence, said pre-programmed sequence selecting among a plurality of activation periods depending on different combinations of materials of said golf club head and said golf shaft.

21. The method of claim 20, wherein said pre-programmed sequence utilizes identification means to identify the particular combination of materials of said golf club head and said golf club shaft placed in the combination alignment and heat curing station.

* * * * *